United States Patent
Ogrin et al.

(10) Patent No.: US 9,162,145 B2
(45) Date of Patent: Oct. 20, 2015

(54) UNIFIED GAME SCRIPTING LANGUAGE WITH MULTI-PLATFORM INTERPRETER

(75) Inventors: Robert Todd Ogrin, Saugus, CA (US); Jackson Dunstan, Sherman Oaks, CA (US); John Crocker, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 286 days.

(21) Appl. No.: 13/492,536

(22) Filed: Jun. 8, 2012

(65) Prior Publication Data
US 2013/0331189 A1 Dec. 12, 2013

(51) Int. Cl.
A63F 13/12 (2006.01)
A63F 13/30 (2014.01)
A63F 13/40 (2014.01)

(52) U.S. Cl.
CPC .............. *A63F 13/12* (2013.01); *A63F 13/10* (2013.01)

(58) Field of Classification Search
USPC .................................... 463/25, 40, 42; 705/1
See application file for complete search history.

(56) References Cited

U.S. PATENT DOCUMENTS

| | | | |
|---|---|---|---|
| 6,012,984 A | 1/2000 | Roseman | |
| 6,884,172 B1 | 4/2005 | Lloyd | |
| 7,380,168 B2 * | 5/2008 | Raghunandan et al. | 714/27 |
| 7,555,757 B2 * | 6/2009 | Smith et al. | 719/328 |
| 2003/0177187 A1 | 9/2003 | Levine | |
| 2004/0193441 A1 * | 9/2004 | Altieri | 705/1 |
| 2004/0237120 A1 | 11/2004 | Lewin | |
| 2007/0150902 A1 | 6/2007 | Meyer | |
| 2007/0155494 A1 * | 7/2007 | Wells et al. | 463/35 |
| 2008/0127127 A1 * | 5/2008 | Chitgupakar et al. | 717/137 |
| 2008/0127200 A1 | 5/2008 | Richards | |
| 2008/0300046 A1 * | 12/2008 | Gagner et al. | 463/25 |
| 2010/0124992 A1 | 5/2010 | Park | |
| 2010/0162126 A1 * | 6/2010 | Donaldson et al. | 715/738 |

OTHER PUBLICATIONS

Carter, Christopher: "The Development of a Networking Middleware and On-Line Deployment Mechanism for Java Based Games" A thesis submitted in partial fulfillment of the requirements of Liverpool John Moores University for the degree of Masters in Computer Games Technology, Dec. 2008, 272 Pgs.

* cited by examiner

*Primary Examiner* — Paul A D'Agostino
*Assistant Examiner* — Brandon Gray
(74) *Attorney, Agent, or Firm* — Farjami & Farjami LLP

(57) ABSTRACT

A method is provided for a unified game scripting language with a multi-platform interpreter. By providing a script editor that creates a unified game logic script, and by processing the unified game logic script through platform conversion modules, game designers can easily specify game logic without coding for a specific platform or making a distinction between server and client. As only a single unified game logic script needs to be maintained, consistency errors from manually maintaining parallel and mirrored code bases is completely eliminated. Moreover, game designers are freed from having to manually weigh the considerations of client side versus server side, low end hardware versus high end hardware, bandwidth limited networks versus bandwidth unlimited networks, specific hardware architectures, specific programming languages, and other technical details. Since platforms are defined by sets of rules, support for additional platforms is readily implemented by creating an associated platform conversion module.

18 Claims, 4 Drawing Sheets

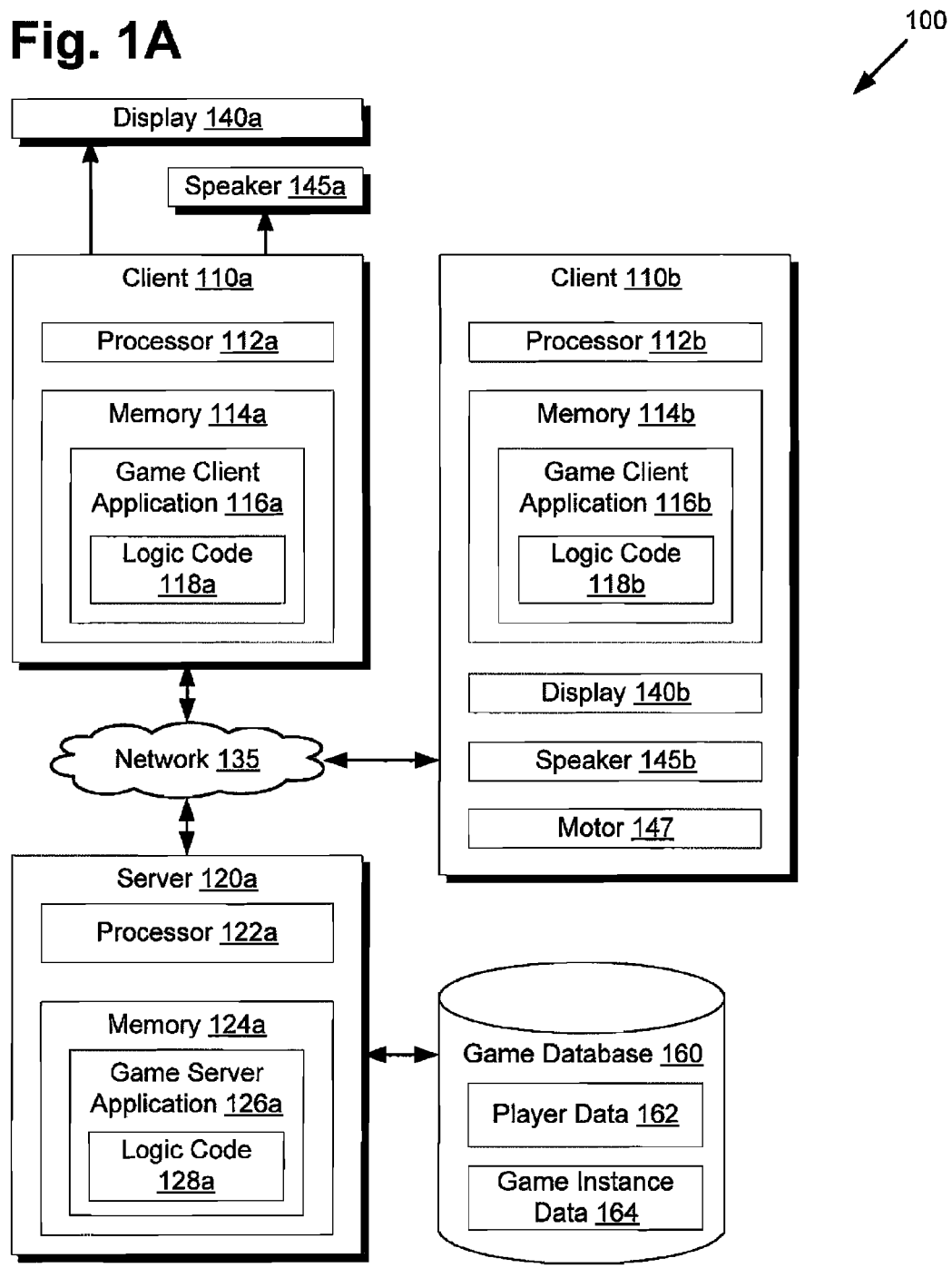

UNIFIED GAME SCRIPTING LANGUAGE WITH MULTI-PLATFORM INTERPRETER

BACKGROUND

In client-server environments such as those for supporting multiplayer online videogames, the server and client architectures may vary significantly. Conventionally, separate code bases may be maintained in parallel for each of the architectures, requiring mirrored updates to fix bugs or add new features.

SUMMARY

The present disclosure is directed to a unified game scripting language with a multi-platform interpreter, substantially as shown in and/or described in connection with at least one of the figures, as set forth more completely in the claims.

BRIEF DESCRIPTION OF THE DRAWINGS

FIG. 1A presents an exemplary diagram of a system providing a networked multi-platform game;

DETAILED DESCRIPTION

Figure 1B:
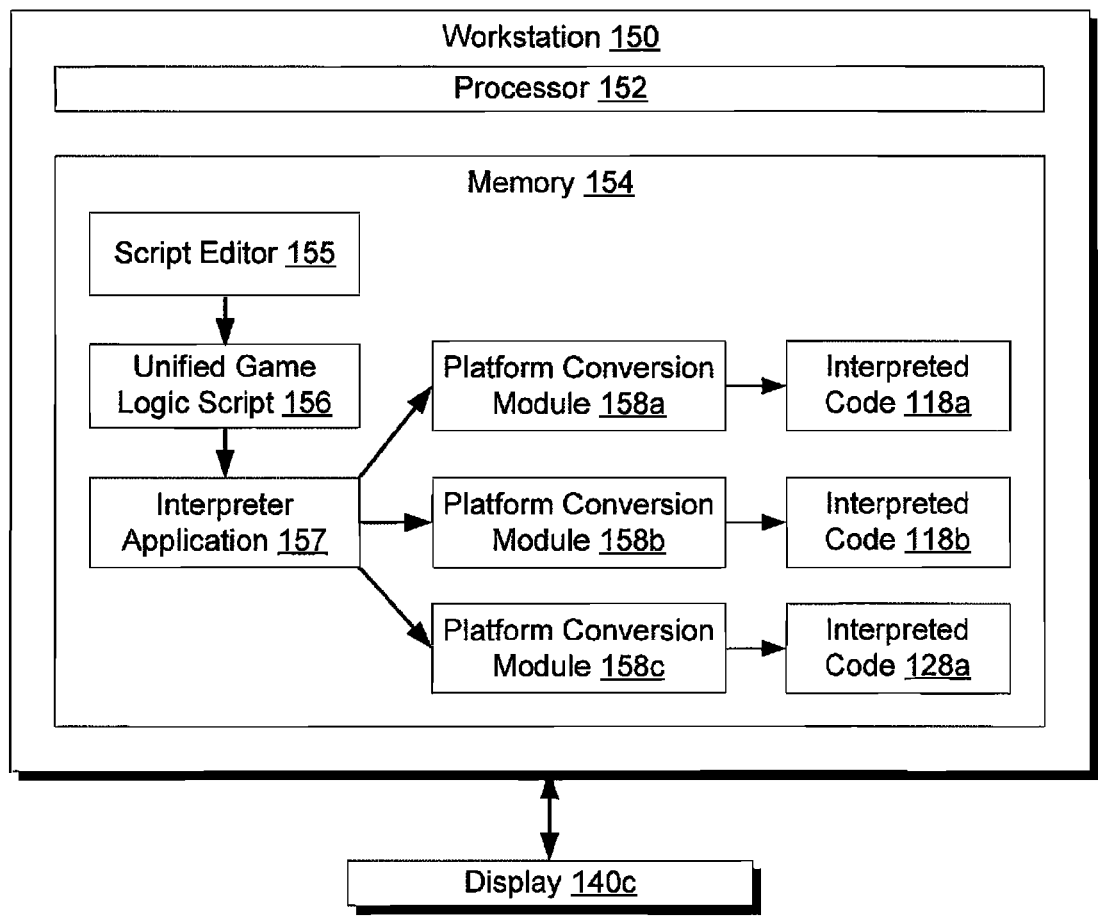
FIG. 1B presents an exemplary diagram of a computing device providing a unified game scripting language editor with a multi-platform interpreter.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary diagram of a system providing a networked multi-platform game. Diagram 100 of FIG. 1 includes client 110a, client 110, server 120a, network 135, display 140a, speaker 145a, and game database 160. Client 110a includes processor 112a and memory 114a. Memory 114a includes game client application 116a and logic code 118a. Client 110b includes processor 112b, memory 114b, display 140b, speaker 145b, and motor 147. Memory 114b includes game client application 116b and logic code 118b. Server 120a includes processor 122a and memory 124a. Memory 124a includes game server application 126a and logic code 128a. Game database 160 includes player data 162 and game instance data 164.

Diagram 100 illustrates a simplified topology for an exemplary networked multi-platform videogame. Accordingly, only two clients 110a-110b and one server 120a are shown. However, alternative implementations may support a much larger number of clients and may provide multiple servers for load balancing and/or reduced latency. Clients 110a-110b and server 120a may be any computing device, such as a desktop computer, laptop computer, tablet, game console, or another device. More specifically, client 110a may be a desktop computer, client 110 may be a mobile phone, and server 120a may be a rack-mounted server. Network 135 may be a public network such as the Internet, and may provide data links between clients 110a-110b and server 120a.

Game database 160 contains player data 162, which may include user profiles, avatars, statistics, customizations, friend lists, and other personal data. Game database 160 also contains game instance data 164, which may contain data for any in-progress multi-player game sessions including player positioning, virtual environments, object placement, player status, rankings, and other data. Game server application 126a may interface with game database 160 to access and modify player data 162 and game instance data 164.

In a multi-player online game, it is desirable to maintain a high level of state synchronization between clients 110a-110b so that all users can experience a coherent virtual environment, which is visually depicted on displays 140a-140b. To provide this level of synchronization, clients 110a-110b may send requests to server 120a to finally arbitrate any game logic affecting multiple clients. Thus, game client applications 116a-116b may send requests to game server application 126a for evaluating multi-player game logic. However, since communications over network 135 may be subject to some unavoidable latency, the total time for receiving a response from server 120a may be significant, resulting in undesirable lag between user actions and the expected responses on displays 140a-140b.

To reduce such latency, each client may instead independently evaluate multi-player game logic using estimation and adaptive predictive algorithms. Thus, logic code 118a and 118b may independently resolve multi-player logic according to best estimates using only locally available data. Client 110a and 110 can then periodically synchronize with server 120a over network 135 to correct any potential deviations from logic code 128a, which can more accurately resolve multi-player logic using remotely retrieved data.

In a conventional development workflow, logic code 118a, 118b, and 128a are developed independently and in parallel. When the game application is multi-platform, separate code bases must be maintained for each supported platform, which may include several different variations of videogame consoles, desktop PCs, mobile phones, and other devices. Moreover, server architectures may also vary as well, as servers may be provided by outside sources or selected based on free computing capacity rather than a specific preferred architecture. When changes to game logic are necessary, mirrored changes to the code bases for all architectures are necessary, requiring developers to learn multiple environments and reducing the ability of designers to make significant changes. This conventional development workflow tends to introduce consistency errors and makes code maintenance difficult, compromising overall software quality.

Accordingly, FIG. 1B presents an exemplary diagram of a computing device providing a unified game scripting language editor with a multi-platform interpreter. FIG. 1b includes display 140c and workstation 150. Workstation 150 includes processor 152 and memory 154. Memory 154 includes script editor 155, unified game logic script 156, interpreter application 157, platform conversion module 158a, 158b, and 158c, and interpreted code 118a, 118b, and 118c.

Script editor 155 may present a text based or graphical user interface (GUI) on display 140c, allowing game designers to script game logic in an abstracted, high-level manner. Accordingly, the user of script editor 155 is not required to understand all the different target platforms of a multi-platform development project, but only the intended logic flow of the game itself. The output of script editor 155 is unified game logic script 156, which specifies high level game logic without platform implementation details.

After unified game logic script 156 is completed, platform conversion modules may be created for interpreter application 157 to interpret unified game logic script 156 for each target platform. For example, continuing with the prior example in FIG. 1A, platform conversion module 158*a* may target a desktop computer by generating ActionScript for a Flash client, platform conversion module 158*b* may target a mobile phone by generating a native binary for a system-on-chip architecture, and platform conversion module 158*c* may target a server by generating object code for a Linux environment. Each platform conversion module may optimize the final interpreted code by adapting to specific hardware resources available to the target platform, by adjusting workloads based on estimated resource availability, by removing unnecessary or unsuitable features, and by providing various other customizations.

Thus, after interpreting unified game logic script 156 through each platform conversion module, interpreted code 118*a*, 118*b*, and 128*a* may be generated, corresponding to logic code 118*a*, 118*b*, and 128*b* respectively in FIG. 1A. Accordingly, logic code 118*a*, 118*b*, and 128*b* can be automatically generated from unified game logic script 156, thereby avoiding the necessity of manually maintaining separate individual code bases as with conventional approaches.

Figure 2:
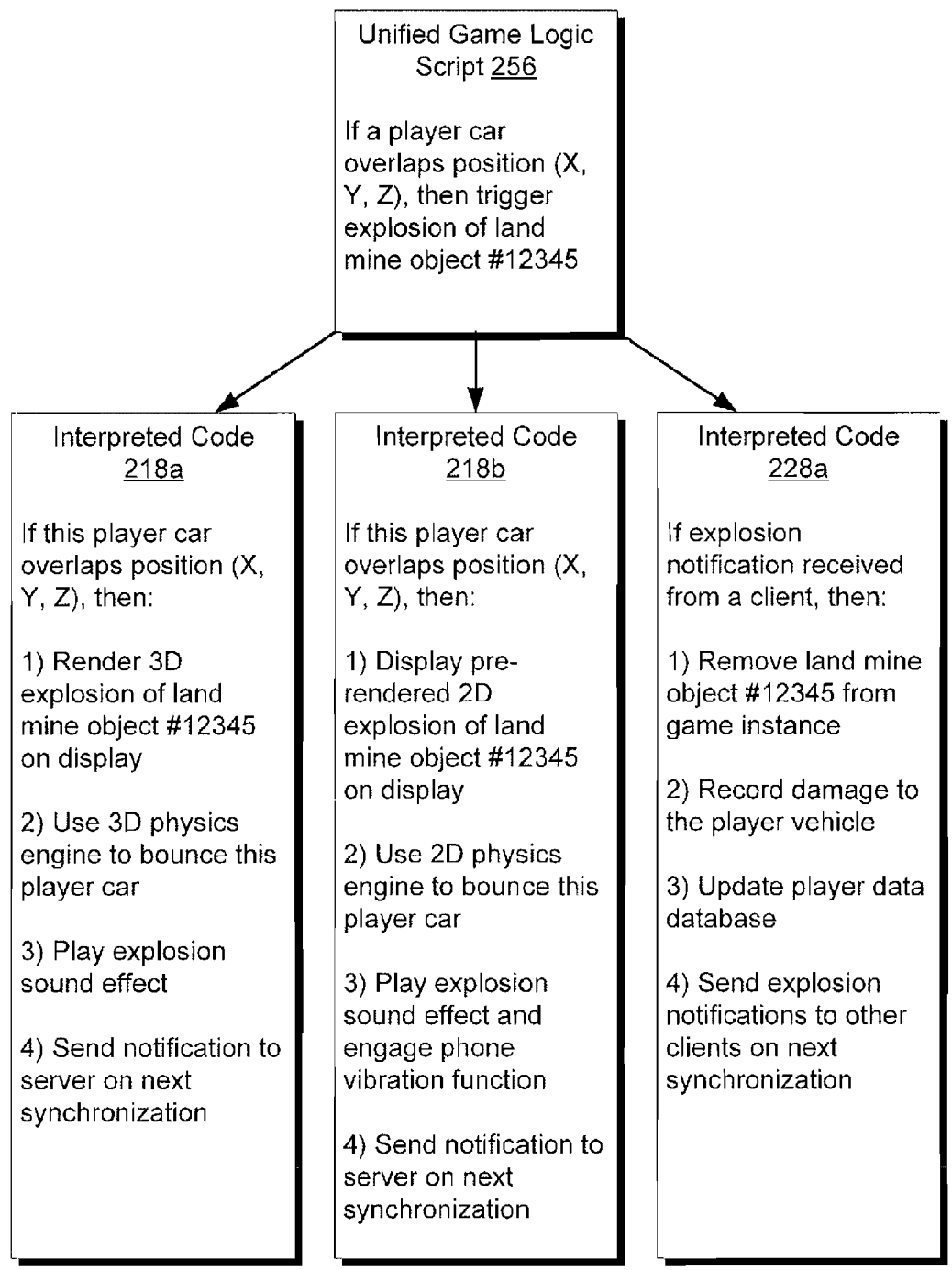
FIG. 2 presents an exemplary diagram of interpreted multi-platform game scripts from a unified game logic script.

Next, FIG. 2 presents an exemplary diagram of interpreted multi-platform game scripts from a unified game logic script. FIG. 2 includes unified game logic script 256, which is interpreted into interpreted code 218*a*, 218*b*, and 228*a*. With respect to FIG. 2, unified game logic script 256 may correspond to unified game logic script 156 from FIG. 1B, and interpreted code 218*a*, 218*b*, and 228*a* may correspond to interpreted code 118*a*, 118*b*, and 128*a* from FIG. 1B, respectively.

As shown in unified game logic script 256, the following high-level script command is specified:

"If a player car overlaps position (X, Y, Z), then trigger explosion of land mine object #12345"

As previously discussed, to reduce latency, each client may independently execute game logic scripts in parallel, periodically synchronizing with a server. By using a process similar to that described above in FIG. 1B, unified game logic script 256 may be interpreted using various platform conversion modules into interpreted code 218*a*, 218*b*, and 228*a*.

Interpreted code 218*a* is targeted towards a desktop computer system, or client 110*a* in FIG. 1A. Accordingly, as shown in FIG. 2, if the player car of client 110*a* overlaps position (X, Y, Z), then the following four steps are to be executed by processor 112*a* of client 110*a*:

1) Render 3D explosion of land mine object #12345 on display
2) Use 3D physics engine to bounce this player car
3) Play explosion sound effect
4) Send notification to server on next synchronization Since client 110*a* is a desktop computer, it may be capable of real-time 3D graphics rendering. Accordingly, at step 1 of interpreted code 218*a*, a 3D explosion is rendered of land mine object #12345 on display 140*a*. Similarly, real-time physics may also be readily achieved on a desktop computer, and thus step 2 of interpreted code 218*a* uses 3D physics to realistically bounce the player car of client 110*a*. Since audio capability may be available, sound effects may be played through speaker 145*a* in step 3 of interpreted code 218*a*. To have the server and other clients synchronize with the locally triggered explosion event, a notification may be sent to server 120*a* in step 4 of interpreted code 218*a*. The next synchronization may be queued using a periodic or adaptive update schedule or triggered immediately on-demand.

Interpreted code 218*b* is targeted towards a mobile phone, or client 110*b* in FIG. 1A. Accordingly, as shown in FIG. 2, if the player car of client 11011 overlaps position (X, Y, Z), then the following four steps are to be executed by processor 112*b* of client 110*b*:

1) Display pre-rendered 2D explosion of land mine object #12345 on display
2) Use 2D physics engine to bounce this player car
3) Play explosion sound effect and engage phone vibration function
4) Send notification to server on next synchronization Since client 110*b* is a mobile phone, it may not be capable of advanced 3D graphics. Accordingly, at step 1 of interpreted code 218*b*, a pre-rendered 2D explosion is shown for land mine object #12345 on display 140*b*. Similarly, since complex physics may be impossible on the hardware specifications of client 110*b*, a simple 2D physics engine may be utilized at step 2 of interpreted code 218*b* to bounce the player car of client 110*b*. Since audio capability may be available, sound effects may be played through speaker 145*b* in step 3 of interpreted code 218*b*. Moreover, since client 110*b* also includes motor 147, a phone vibration function may also be triggered using motor 147 to additionally provide force feedback. At step 4 of interpreted code 218*b*, a notification may be sent to server 120*a*, in a manner similar to step 4 of interpreted code 218*a*. However, to account for mobile broadband data caps and connection speeds, notification updates may be less frequent for interpreted code 218*b* compared to interpreted code 218*a*, which may have access to high speed wired broadband without data caps.

Interpreted code 228*a* is targeted towards a server, or server 120*a* in FIG. 1A. Accordingly, as shown in FIG. 2, if an explosion notification is received from any client, then the following four steps are to be executed by processor 122*a* of server 120*a*:

1) Remove land mine object #12345 from game instance
2) Record damage to the player vehicle
3) Update player data database
4) Send notifications to other clients on next synchronization Since server 120*a* does not need to provide visual or audio feedback for a user, rendering of graphics and sound output may be omitted. Accordingly, interpreted code 228*a* focuses on bookkeeping duties such as updating records and client synchronization. At step 1 of interpreted code 228*a*, land mine object #12345 is removed from the game instance. Thus, game instance data 164 in game database 160 may be updated to reflect that land mine object #12345 has already detonated and should no longer exist in the present game instance. At step 2 of interpreted code 228*a*, damage is recorded to the player vehicle. Thus, processor 122*a* may calculate the damage based on the positioning, speed, and other properties of the player vehicle, updating game instance data 164 as necessary. At step 3 of interpreted code 228*a*, player data 162 is updated, for example by keeping track of the number of land mines detonated by each player car for ranking purposes. At step 4 of interpreted code 228*a*, the explosion notification is sent to the remaining other clients on the next synchronization. For example, if the explosion notification was received from client 110*a*, then the explosion notification may be sent to client 110*b* so that client 110*b* can also render the explosion on display 140*b*.

Accordingly, it can be seen that the platform conversion modules can apply various rules to interpret unified game logic script 256 into interpreted code 218a, 218b, and 228a. One rule may specify the language of the interpreted code for a specific hardware architecture, such as C, Java, Javascript, Flash/Actionscript, or another language. Another rule may specify the specific format of the interpreted code for the hardware architectures, such as natively compiled machine code, library files, intermediate byte code, text-based scripts, source code, HTML, or another format. Another rule may guide the division of client and server tasks, for example where only clients render graphics and output sound and where only servers handle updating of game instance data and database records. Another rule may tailor the interpreted code based on the performance of the hardware environment, providing higher quality visuals and sound for more powerful hardware and less demanding assets for more limited hardware. Yet another rule may adjust network usage based on available network connectivity, for example by conserving bandwidth for data capped mobile broadband connections.

Thus, by utilizing script editor 155 and interpreter application 157 in FIG. 1B, game designers are enabled to specify game logic without specifying the specific details of client side versus server side, low end hardware versus high end hardware, bandwidth limited networks versus bandwidth unlimited networks, specific hardware architectures, specific programming languages, and other technical details. Since platforms are defined by sets of rules, support for additional platforms is readily implemented by creating an associated platform conversion module. Moreover, since only a single unified game logic script 156 needs to be maintained, consistency errors from manually maintaining parallel and mirrored code bases is completely eliminated.

Figure 3:
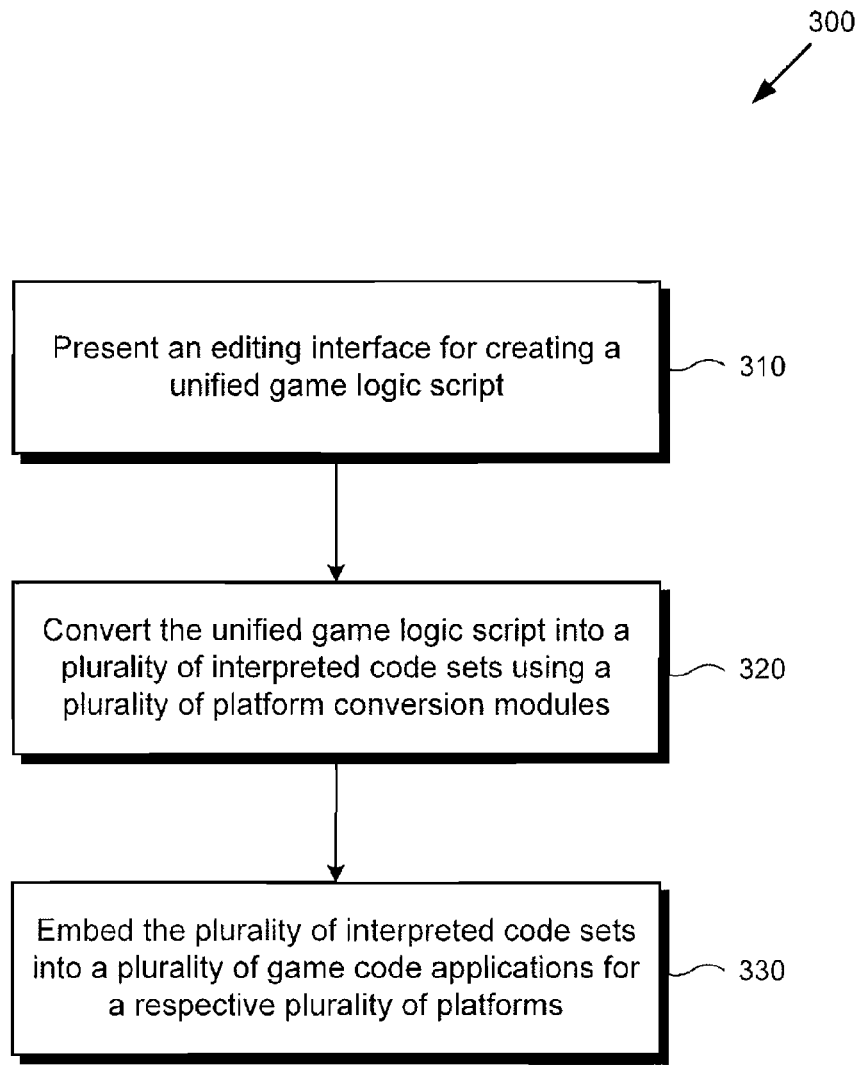
FIG. 3 presents an exemplary flowchart illustrating a method by which a computing device may provide a unified game scripting language editor with a multi-platform interpreter.

FIG. 3 presents an exemplary flowchart illustrating a method by which a computing device may provide a unified game scripting language editor with a multi-platform interpreter. Flowchart 300 begins when processor 152 of workstation 150 presents an editing interface for creating unified game logic script 156 (block 310). For example, processor 152 may execute script editor 155, providing a text-based or graphical user interface (GUI) on display 140c to enable a user to create or modify unified game logic script 156. Next, processor 152 of workstation 150 converts unified game logic script 156 into interpreted code 118a, 118b, and 128a using platform conversion modules 158a, 1548b, and 158c, respectively (block 320). For example, processor 152 may execute interpreter application 157 to perform the conversion, which may carry out a process similar to that shown in FIG. 2 as described above. Next, processor 152 of workstation 150 embeds interpreted code 118a as logic code 118a of game client application 116a, interpreted code 118b as logic code 118b of game client application 116b, and interpreted code 128a as logic code 128a of game server application 126a (block 330). The completed system as shown in FIG. 1A is then enabled to provide a multiplayer, multi-platform networked game.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing device for providing a unified game scripting language with a multi-platform interpreter, the computing device comprising:
   a processor configured to:
   present an editing interface for creating a unified game logic script for a game;
   periodically receive synchronization data corresponding to a synchronization event in the game;
   convert the unified game logic script and the synchronization data into a plurality of interpreted code sets using a plurality of platform conversion modules, wherein each of the plurality of platform conversion modules targets a specific platform from a respective one of a plurality of platforms, wherein each of the plurality of platform conversion modules adjusts network usage for each respective one of the plurality of interpreted code sets based on available network connectivity of the respective one of the plurality of platforms:
   embed the plurality of interpreted code sets into a plurality of game code applications for the respective one of the plurality of platforms; and
   send at least one of the plurality of game code applications for display by at least one client device.

2. The computing device of claim 1, wherein said editing interface is a graphical user interface (GUI) shown on a display.

3. The computing device of claim 1, wherein said plurality of platform conversion modules divide tasks according to the plurality of platforms being server or client.

4. The computing device of claim 1, wherein said plurality of platform conversion modules specifies a language of the plurality of interpreted code sets based on hardware architecture of the plurality of platforms.

5. The computing device of claim 1, wherein said plurality of platform conversion modules specifies a format of the plurality of interpreted code sets based on a hardware architecture of the plurality of platforms.

6. The computing device of claim 1, wherein said plurality of platform conversion modules tailors the plurality of interpreted code sets based on a performance of a hardware architecture of the plurality of platforms.

7. A method for providing a unified game scripting language with a multi-platform interpreter, the method comprising:
   presenting an editing interface for creating a unified game logic script for a game;
   periodically synchronizing data corresponding to a synchronization event in the game;
   converting the unified game logic script and the synchronization data into a plurality of interpreted code sets using a plurality of platform conversion modules, wherein each of the plurality of platform conversion modules targets a specific platform from a respective one of a plurality of platforms, wherein each of the plurality of platform conversion modules adjusts network usage for each respective one of the plurality of interpreted code sets based on available network connectivity of the respective one of the plurality of platforms;
   embedding the plurality of interpreted code sets into a plurality of game code applications for the respective one of the plurality of platforms; and sending at least one of the plurality of game code application for display on at least one client device.

8. The method of claim 7, wherein said editing interface is a graphical user interface (GUI) shown on a display.

9. The method of claim 7, wherein said plurality of platform conversion modules divide tasks according to the plurality of platforms being server or client.

10. The method of claim 7, wherein said plurality of platform conversion modules specifies a language of the plurality of interpreted code sets based on hardware architecture of the plurality of platforms.

11. The method of claim 7, wherein said plurality of platform conversion modules specifies a format of the plurality of interpreted code sets based on a hardware architecture of the plurality of platforms.

12. The method of claim 7, wherein said plurality of platform conversion modules tailors the plurality of interpreted code sets based on a performance of a hardware architecture of the plurality of platforms.

13. A computing device for receiving a unified game scripting language from a multi-platform interpreter, the computing device comprising:
 a display; and
 a processor configured to:
  receive a unified game logic script for a game;
  periodically receive synchronization data corresponding to a synchronization event in the game;
  convert the unified game logic script and the synchronization data into an interpreted code set using a platform conversion module, wherein the platform conversion module targets a platform of the computing device, wherein the platform conversion module adjusts network usage of the interpreted code set based on available network connectivity of the platform;
  embed the interpreted code set into a game code application for the computing device; and
  render the game code application on the display.

14. The computing device of claim 13, wherein the processor is further configured to:
 present an editing interface for creating a unified game logic script for a game.

15. The computing device of claim 14, wherein the editing interface is a graphical user interface (GUI) shown on the display.

16. The computing device of claim 13, further comprising a speaker, wherein the processor is configured to play sound effects through the speaker.

17. The computing device of claim 13, wherein said platform conversion module specifies a language of the interpreted code set based on hardware architecture of the computing device.

18. The computing device of claim 13, wherein said platform conversion module tailors the interpreted code set based on a performance of a hardware architecture of the computer device.

\* \* \* \* \*